United States Patent [19]
Kranefeld

[11] 3,850,380
[45] Nov. 26, 1974

[54] SAFETY DEVICE FOR CABLE WINCH DRUM

[75] Inventor: Wilhelm Kranefeld, Wetter-Ruhr, Germany

[73] Assignee: Orenstein & Koppel Aktiengesellschaft, Berlin, Germany

[22] Filed: June 7, 1972

[21] Appl. No.: 260,582

[30] Foreign Application Priority Data
June 9, 1971  Germany............................ 2128614

[52] U.S. Cl.............. 242/54 R, 200/61.15, 242/49, 242/57, 254/173 R
[51] Int. Cl...... B65h 63/00, B65h 25/14, B66h 1/48
[58] Field of Search .............. 242/54, 49, 57, 86.51; 254/173 R; 200/61.15

[56] References Cited
UNITED STATES PATENTS

| 996,267 | 6/1911 | Lutz | 200/67 |
|---|---|---|---|
| 2,781,456 | 2/1957 | Buckeridge | 242/86.51 X |
| 3,380,545 | 4/1968 | Kemper | 232/86.51 X |

FOREIGN PATENTS OR APPLICATIONS

| 144,871 | 3/1936 | Germany | 242/54 |
|---|---|---|---|
| 621,051 | 10/1935 | Germany | 242/57 |

Primary Examiner—John W. Huckert
Assistant Examiner—John M. Jillions
Attorney, Agent, or Firm—Walter Becker

[57] ABSTRACT

A safety device for cable winch drums to stop the unwinding rotation of the drum when a predetermined cable winding has wound off the drum, according to which in response to the unwinding of said predetermined cable winding from the drum a mandrel connected to a pivotably journalled lever causes the latter to actuate a switch which in its turn through the intervention of relay causes a control valve to interrupt the supply of working medium to the motor driving the drum.

1 Claim, 2 Drawing Figures

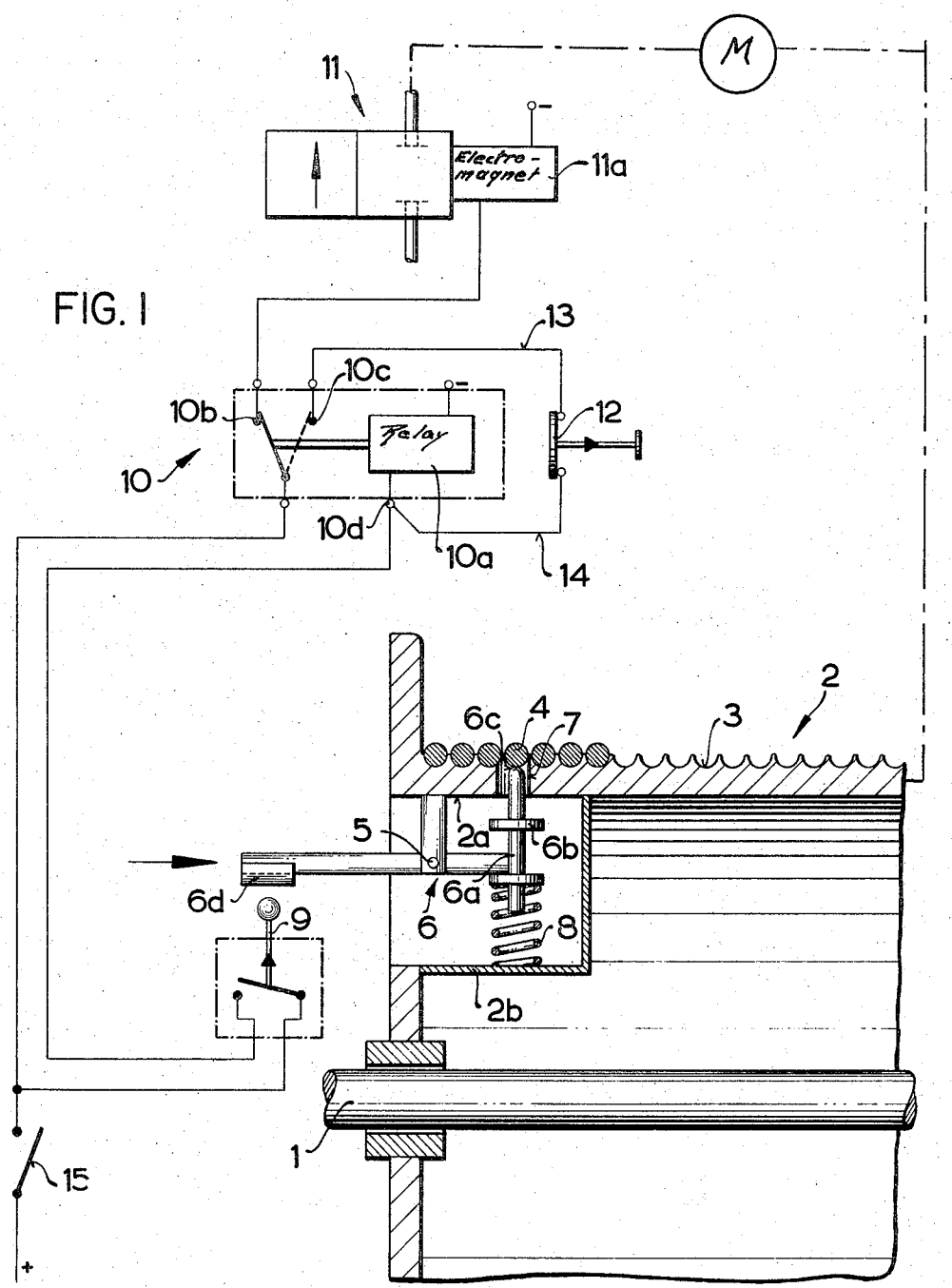
FIG. 1
FIG. 2
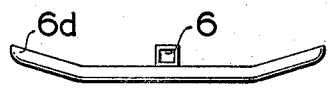

3,850,380

SAFETY DEVICE FOR CABLE WINCH DRUM

The present invention relates to a safety device for cable winch drums with a mechanical operation of the switch-off of the drive motor prior to the winding off of the entire cable.

According to a heretofore known safety device of this kind, a cable feeling roller of hardened steel is by means of a strong spring continuously pressed against the unwinding cable until that cable winding has been reached at which the drive motor is to be switched off. The angular position of the feeler lever is decisive in this connection which angular position corresponds to the diameter of the cable drum as it is obtained after the respective cable drum windings have been wound off from the drum. Aside from the fact that such an arrangement requires relatively many parts and is expensive because it must be assured that the roller is continuously pressed against the moving cable, such an arrangement also results in an undesired premature wear of the cable.

According to other heretofore known devices operating with an electric circuit and contacts for giving off a pulse which in turn brings about the switching off of the motor, there exists the danger, due to unfavorable weather conditions and, for instance, also with collector rings, that the device will not work satisfactorily and that the safety device will fail.

It is, therefore, an object of the present invention to provide a safety device which by a positive design of the switch actuating mechanism will assure a maximum of safety and which will operate with a minimum of structural elements while not unduly wearing the cable operating as supporting element.

This object and other objects and advantages of the invention will appear more clearly from the following specification in connection with the accompanying drawing, in which:

FIG. 1 diagrammatically illustrates a section through a portion of the cable winch drum and also shows the control device for the safety switch mechanism which turns off the motor driving the winch drum.

FIG. 2 shows a side view of the slide as seen in the direction of the arrow of FIG. 1.

The safety device according to the present invention is characterized primarily in that at a pivot point in the cable winch drum there is journalled a lever which at that end thereof that extends into the drum carries a mandrel provided with an abutment, the mandrel engaging an opening in the drum and having a slide connected to that free end of the mandrel which protrudes from the drum. This lever is so journalled that that end thereof which is provided with the mandrel will, as soon as a predetermined cable winding during the winding off operation is lifted off the drum, by means of a spring be pressed against the inner wall of the drum until it hits an abutment whereupon a switch is actuated for switching off the drive motor of the drum.

In order to assure that also with the gradual stopping or slowing down of the drum and the lifting off of the slide caused thereby the blocking of the unwinding operation of the cable from the drum will be maintained, it is suggested, according to a further development of the invention, to connect the contact of a relay through conductors, a switch and a terminal to the armature of the relay.

Referring now to the drawing in detail, the cable winch drum 2 rotatable about the shaft 1 carries the cable 4 which is located in cable grooves 3 at the outer circumference of the drum and winds off therefrom. At a pivot point 5 arranged on the inner circumference 2a of the drum 2 there is journalled a lever 6. That arm of the lever 6 which is located within the drum 2 forms a mandrel 6a which is provided with an abutment 6b. The mandrel 6a extends through an opening 7 provided in the wall of drum 2 and has its free end which is provided with a rounding 6c engage that cable winding 4 which is intended, when being lifted off from the drum, to terminate the further lowering of the cable. In order to assure that the mandrel 6a remains continuously pressed with its rounded portion against the cable winding 4, there is provided a spring 8 which rests in a recess 2b in the drum inner wall 2a.    a When the cable winding 4 which is engaged by the mandrel 6a will during the unwinding operation lift off from the drum, lever 6 is, on one hand, with its mandrel 6a pressed into the opening 7 until the abutment 6b engages the inner periphery of the drum and, on the other hand, by means of the slide 6d arranged at the free end of the lever 6 closes the elctric switch 9. In this instance, the armature 10a of the relay 10 receives voltage and attracts. As a result thereof, contact 10b is disengaged and contact 10c closes. In this way electric voltage is fed from the contact 10c through terminal 10d, and the armature 10a is continuously placed under voltage and keeps the contact 10c closed.

In this way, also when the cable winch drum 2 will, due to a non-precise or non-instantaneous operation of the brake (caused, for instance, by wear), come only to a gradual stop so that the slide 6d will move slightly beyond the switch 9, it will be assured that the valve spool of the distributing device or valve 11 will by means of a magnet 11a keep the flow of the working medium interrupted and will assure that the drum 2 cannot be driven. This additional safety blocking of the winding off operation will be made ineffective only after the switch 12 which through conductors 13 and 14 is connected with the contact 10c and the terminal 10d has been briefly opened manually and the supply of electric current from contact 10c through terminal 10d has been interrupted. Only when this is effected, will the armature 10a be de-energized and close the contact 10b and supply the magnet 11a of the valve or distributing device 11 with voltage so that the throughflow of the working medium is again made possible. The entire arrangement is switched on and switched off by the main switch 15.

It is, of course, to be understood that the present invention is, by no means, limited to the particular showing in the drawing, but also comprises any modifications within the scope of the appended claims.

What I claim is:

1. In combination with a winch drum having peripheral grooves for receiving more than two layers of windings of a cable, a safety stopping device which includes: lever means journalled and pivotally supported within said drum internally thereof for safety reasons and having a first arm within said drum and a second arm projecting axially outwardly from said drum, said drum having a bore leading from the interior of said drum through the latter into that one of said grooves which is intended to receive that cable winding which when being lifted out of said one groove is intended to initiate the stopping of said drum, mandrel means provided with an abutment connected to said first arm and located within said drum and normally extending into said bore, said mandrel means with said abutment being prevented from extending into said one groove by the cable winding in said one groove, pressure spring means for safety reasons continuously urging said mandrel means to move into said one groove, fluid motor means drivingly connected to said drum for driving the same, and control means operatively connected to said motor means for controlling the latter, said control means including magnetically operated fluid valve means for controlling flow of fluid to said motor means, a holding relay having contacts to energize said magnetically actuated fluid valve means to hold said valve means open to supply fluid to said motor means, said relay when energized opening said contacts and closing a holding circuit, switch means having an operating arm engageable by said second arm in response to said mandrel means moving into said one groove when the cable winding in said one groove leaves the latter to close said switch means and energize said relay to thereby cause the supply of working medium to said motor means to stop automatically, and a manual switch in said holding circuit for said relay to de-energize said relay and open said valve means.

* * * * *